United States Patent
Kurtzner, III et al.

(10) Patent No.: US 11,875,374 B2
(45) Date of Patent: Jan. 16, 2024

(54) AUTOMATED AUDITING AND RECOMMENDATION SYSTEMS AND METHODS

(71) Applicant: Util Auditors, LLC, Fort Lauderdale, FL (US)

(72) Inventors: William Fredrick Kurtzner, III, Boynton Beach, FL (US); Christopher John Panucci, Charlotte, NC (US)

(73) Assignee: Util Auditors, LLC, Fort Lauderdale, FL (US)

( * ) Notice: Subject to any disclaimer, the term of this patent is extended or adjusted under 35 U.S.C. 154(b) by 0 days.

(21) Appl. No.: 17/730,955

(22) Filed: Apr. 27, 2022

(65) Prior Publication Data

US 2022/0343358 A1    Oct. 27, 2022

Related U.S. Application Data

(60) Provisional application No. 63/180,508, filed on Apr. 27, 2021.

(51) Int. Cl.
*G06Q 20/10* (2012.01)
*G06Q 30/0207* (2023.01)
*G06Q 30/0226* (2023.01)
*G06Q 30/04* (2012.01)

(52) U.S. Cl.
CPC ......... *G06Q 30/0224* (2013.01); *G06Q 20/10* (2013.01); *G06Q 30/0231* (2013.01); *G06Q 30/04* (2013.01)

(58) Field of Classification Search
CPC ...................................... G06Q 30/04
USPC ...................................... 705/35, 1.1
See application file for complete search history.

(56) References Cited

U.S. PATENT DOCUMENTS

| | | | |
|---|---|---|---|
| 6,988,084 B1 | 1/2006 | Dibacco | |
| 7,440,557 B2 | 10/2008 | Gunderman, Jr. | |
| 7,707,152 B1 * | 4/2010 | Greenfield | G06F 16/951 707/999.1 |
| 8,131,609 B1 | 3/2012 | Hart, Jr. et al. | |
| 11,205,192 B1 * | 12/2021 | Rivera | G06Q 30/0244 |
| 2014/0279314 A1 | 9/2014 | Ostertag et al. | |

(Continued)

FOREIGN PATENT DOCUMENTS

| | | |
|---|---|---|
| CA | 2301574 A1 | 6/1999 |
| WO | 2012170552 A2 | 12/2012 |

(Continued)

*Primary Examiner* — William E Rankins
(74) *Attorney, Agent, or Firm* — Outlier Patent Attorneys, PLLC

(57) ABSTRACT

The present invention relates to systems and methods for automated audit analysis and providing of cost reduction recommendations associated with services used and/or received by an entity. In general, invoice data associated with a service associated with an entity (e.g. a customer) is obtained and processed in order to identify at least one of billing errors and inefficiencies. The processing of invoice data is generally performed by computationally identifying relevant invoice information and comparing this information with data from a proprietary service optimization database. When errors and/or inefficiencies are identified, recommendations to remedy the inefficiencies and/or errors are provided to the entity so that cost reduction actions can be taken.

17 Claims, 7 Drawing Sheets

(56) References Cited

U.S. PATENT DOCUMENTS

| | | |
|---|---|---|
| 2015/0262203 A1 | 9/2015 | Peusch et al. |
| 2017/0236218 A1 | 8/2017 | Shak et al. |
| 2018/0336648 A1 | 11/2018 | Kasaraneni et al. |

FOREIGN PATENT DOCUMENTS

| | | | |
|---|---|---|---|
| WO | WO-2013066364 A2 * | 5/2013 | ............ G06Q 10/10 |
| WO | 2017120155 A1 | 7/2017 | |
| WO | 2018213234 A1 | 11/2018 | |

* cited by examiner

AUTOMATED AUDITING AND RECOMMENDATION SYSTEMS AND METHODS

CROSS-REFERENCE TO RELATED APPLICATIONS

This application claims the benefit of U.S. Provisional Application 63/180,508, filed Apr. 27, 2021, titled "AUTOMATED AUDITING AND RECOMMENDATION SYSTEMS AND METHODS," which is herein incorporated by reference in its entirety.

BACKGROUND

For each service a customer receives from a provider, the associated service contract(s) and/or recurring invoices may include various billing errors such as improper fees and taxes, missed incentives, exemptions and/or credits available to a given customer, or simple inefficiencies such as not having the optimal plan for the particular customer's usage or needs. From large companies to small businesses and individual homeowners, a wide range of services may be received such as utility services (e.g. electric, gas, water, etc.), contracted services (e.g. telecom/wireless, information technology hardware/software, waste management, etc.), financial services (e.g. merchant processing, bank fees, retirement plans, insurance, etc.), and real estate services (e.g. property tax assessments, relocation assessments, cost segregation, etc.), depending on the particular customer. For each of these services there may be different potential cost savings available to a given customer.

One possible approach to identify potential cost savings associated with service contracts and invoices, is customer driven review of invoices and/or service contracts and comparison with their current needs. However, even in circumstances where a customer felt there was potential to reduce costs, many customers may not know what action to take or where to look for available cost saving opportunities. For example, invoices may be complex, difficult to understand, and a single line entry may represent several charges lumped together, some of which may not be applicable to a given customer. In addition, some customers may not even be aware that opportunities to reduce costs exist.

An alternative approach to identify potential cost savings could be to hire an external auditing consultant. In either of these approaches, invoice and service contract auditing is often a manual process which can be time intensive and expensive. Such a time and cost investment for manual audit analysis may only be affordable and beneficial to large customers where significant savings can be recognized. A further complication associated with auditing of service contracts and invoices includes the need for regular and routine auditing which again can be time consuming and costly and additionally requires staying up to date with available programs, exemptions, incentives, rate plans, etc. as fee structures and government regulations can change over time.

SUMMARY

The systems and methods disclosed herein can vastly simplify invoice and service contract auditing processes for companies of all sizes, as well as provide a simple and affordable auditing solution for individual customers. Rather than a customer needing to identify errors and inefficiencies themselves, they simply provide invoice data (e.g. invoices and/or service contracts), generally in electronic form, to an audit module which in turn performs the necessary audit analysis. The audit module receives the invoice data, automatically extracts information relevant to the auditing process, compares the extracted information with service optimization parameters, and makes recommendations as a result of the comparison in order to optimize service and reduce costs.

In one aspect, the extraction process involves determining a service provider, then using an appropriate template for that service provider or service type, if a template is available, in order to more accurately and efficiently extract the relevant information. If a template is not available the systems and methods herein may use extracted information to build templates so that future processing of invoices and/or service contracts of similar service providers/types can be accomplished in a more efficient manner. The extracted data can include items such as service address, account number, usage data, fees, taxes, total invoice amount, and the like which are then compared against the optimization parameters to identify errors and inefficiencies by verifying aspects such as optimal rate structures, service levels, fees, unnecessary charges, availability of programs, benefits, incentives, tax exemptions, and the like. Any identified errors and inefficiencies are compiled in a detailed report along with a recommended plan of action for the customer to recover overages and/or adjust their service in order to reduce future costs.

As a result of the reduced time requirements associated with the disclosed auditing processes, the cost of auditing is thereby reduced. Furthermore, on a regular basis customers simply need to provide the repeating invoice data (e.g. monthly invoices), and the audit module automatically updates the audit analysis using the disclosed systems and methods. An additional benefit of the disclosed systems and methods includes the ability to process substantially more invoices and service contracts in significantly less time than typical manual audit approaches.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
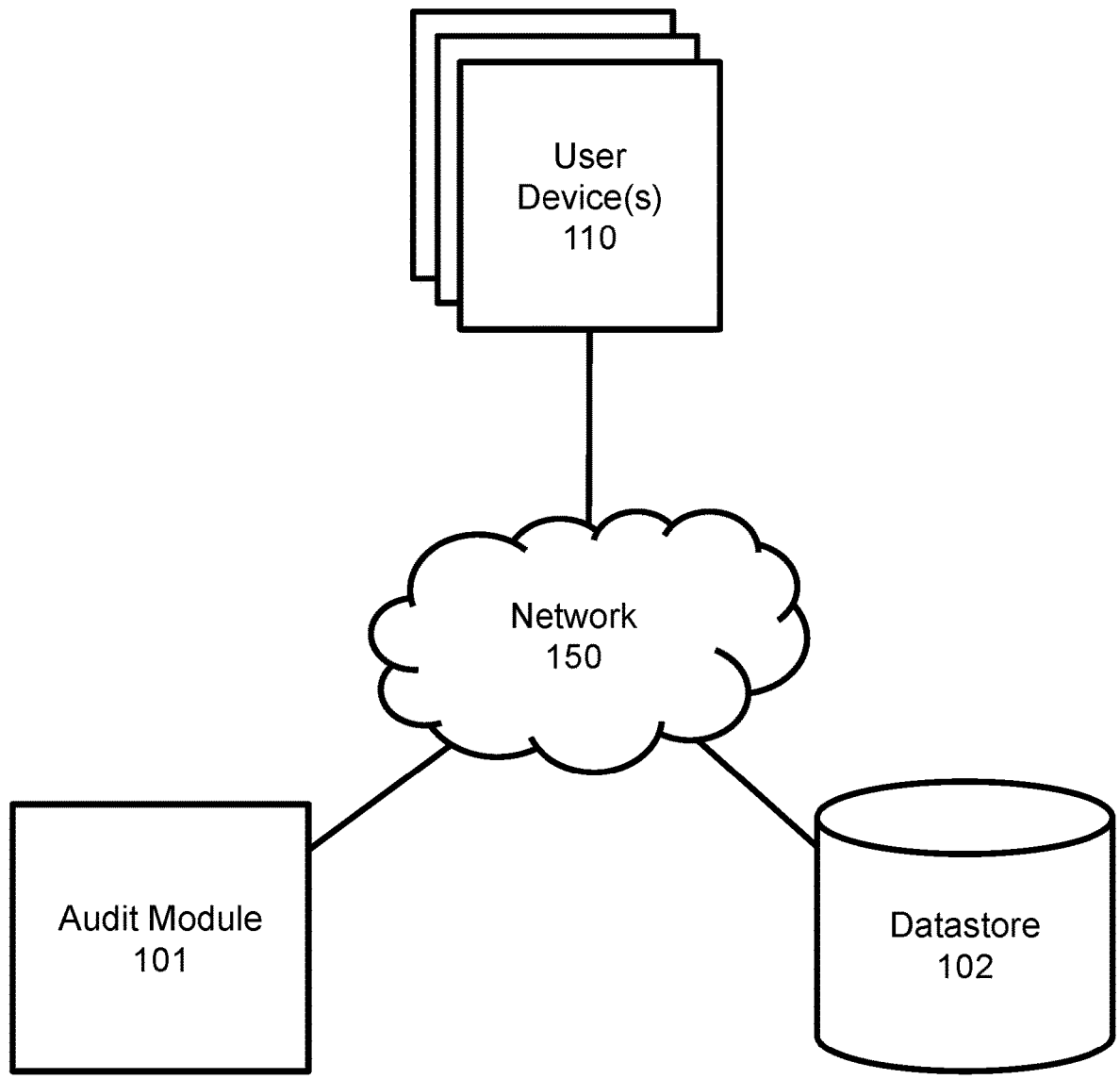
FIG. 1 illustrates an automated auditing and recommendation system in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an exemplary embodiment of an automated audit and recommendation system 100 according to one embodiment. The system 100 includes user device(s) 110, audit module 101, datastore 102, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

Audit module 101 receives invoice data such as invoices and/or service contracts, analyzes the invoice data to determine service inefficiencies and overages, and makes recommendations aimed at reducing customer costs. Invoice data may be any source of data for use in auditing, which may also be referred to herein as audit source data, and may not necessarily be derived solely from invoices. For example, invoice data may comprise data associated with service contracts, service quotes, terms of service, and the like, which may serve as a basis for formal invoicing at a later time. Audit module 101 obtains invoice data in formats such as portable document format (PDF), joint photographic experts group (JPG or JPEG), portable network graphics (PNG), tagged image file format (TIFF), and the like, converts invoice data into a text searchable format, as necessary, and extracts relevant information from the invoice data. In one embodiment, audit module 101 uses invoice and/or service contract templates in order to improve speed and accuracy of relevant information extraction. In one embodiment, audit module 101 may directly receive relevant information without the need to perform extraction processing such as via manual data entry of necessary relevant information via a user interface which in turn provides the relevant information to the audit module 101.

Relevant information for auditing processes may comprise customer name, service provider name, service address, usage data, invoice amount, billing period, due date, taxes, fees, and the like. In general, audit module 101 is configured to audit services such as utility services (e.g. electric, gas, water, sewer, other commercial fuels, etc.), financial services (e.g. merchant processing, insurance plans such as workers' compensation or liability insurance, retirement plans, virtual card platforms), contracted services (e.g. waste removal, telecom/wireless, information technology, shipping/freight), and commercial real estate services (e.g. location/relocation assessment, property tax assessment, cost segregation, financing), however any service involving an invoice and/or service contract may be audited using the approaches disclosed herein without departing from the scope of the invention. Audit module 101 compares extracted information with a service optimization datastore to determine inefficiencies in current service, compute potential cost savings, and make recommendations to achieve the optimal service for the customer to recognize the identified cost savings.

Datastore 102 stores data associated with automated audit and recommendation system 100 including but not limited to customer and user information, received invoice data, invoice and service contract templates, and recommendation reports generated by audit module 101. While depicted as a separate component, datastore 102 may be incorporated into audit module 101 without departing from the scope of the invention.

User device(s) 110, also referred to herein as client device(s) 110, generally comprise a computing device which a customer or end user uses to provide invoice data and receive recommendations regarding their service. User device(s) may be used to provide invoice data in a variety of file formats including but not limited to those listed above or may be used to manually enter the relevant information such as entering the relevant information in appropriate fields via a user interface.

Client device(s) 110 include, generally, a computer or computing device including functionality for communicating (e.g., remotely) over a network 150. Data may be collected from client devices 110, and data requests may be initiated from each client device 110. Client device(s) 110 may be a server, a desktop computer, a laptop computer, personal digital assistant (PDA), an in- or out-of-car navigation system, a smart phone or other cellular or mobile phone, or mobile gaming device, among other suitable computing devices. Client devices 110 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application 533 interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
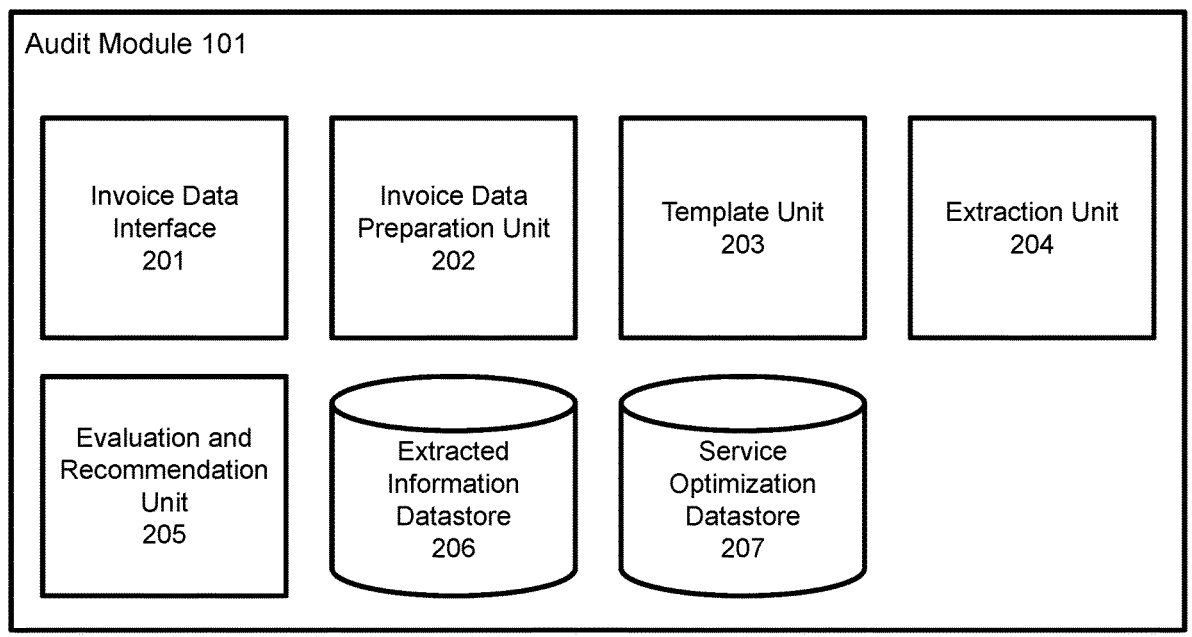
FIG. 2 illustrates an automated auditing and recommendation system in accordance with an exemplary embodiment of the present invention.

FIG. 2 illustrates an exemplary embodiment of an audit module 101 in accordance with the invention. Audit module 101 comprises invoice data interface 201, invoice data preparation unit 202, template unit 203, extraction unit 204, evaluation and recommendation unit 205, extracted information datastore 206, and service optimization datastore 207. Other systems, units, interfaces, engines and datastores may be used, as would be readily understood by a person of ordinary skill in the art, without departing from the scope of the invention.

Invoice data interface 201 obtains invoice data for audit analysis. Invoice data generally refers to data associated with services received by, used by or provided to an entity (such as an individual or business). Invoice data, which may also be referred to herein as audit source data, may be any source of data for use in auditing, and may not necessarily be derived solely from invoices. For example, invoice data may comprise data associated with service contracts, service quotes, terms of service, service statements, and other service related documentation which may serve as a basis for formal invoicing at a later time. Invoice data interface 201 may obtain invoice data via various approaches comprising, but not limited to, email, web portal upload/download, and directly from a service provider (with customer authorization if required). Invoice data interface 201 may obtain invoice data in various formats suitable for further processing comprising, but not limited to, portable document format (PDF), joint photographic experts group (JPG or JPEG), portable network graphics (PNG), tagged image file format (TIFF), and the like. In this way, customers are afforded various options for providing invoice data such as downloading from a service provider, scanning hard copies or capturing images of hard copies with a smartphone or tablet, then emailing or uploading the documents for audit processing. In one aspect, invoice data interface 201 may obtain invoice data in the form of at least one of a database entry and an XML file.

Invoice data preparation unit 202 prepares obtained invoice data for information extraction, as necessary. Invoice data preparation unit 202 performs analysis of the obtained invoice data and performs appropriate modifications to prepare invoice data for data extraction. In one aspect of the invention, invoice data preparation unit 202 analyzes invoice data to determine that invoice data is in a text searchable format and/or that text is present. If invoice data is not in text searchable format, invoice preparation unit 202 may perform at least one of optical character recognition (OCR), optical word recognition, intelligent character recognition, intelligent word recognition, text based character recognition, and text based word recognition in order to convert audit data source data into searchable text format for additional processing, such as information extraction and/or identification. Invoice data preparation unit 202 may determine if any perspective distortion correction is required and may performs geometric rectification as necessary. Invoice data preparation unit 202 may determine at least one of locations and sizes of text and/or margins. Invoice data preparation unit 202 may compare at least one of size and location of text and/or margins with a template to determine that invoice data is in a suitable format for additional processing. In one aspect, invoice data preparation unit 202 may perform necessary adjustments (e.g. move, stretch, and/or shrink content, etc.) so at least one of margin and/or text sizes and/or locations fall within the expected bounds of a given template. Different service providers are likely to have different invoice or service document formats. Therefore, in one aspect, invoice data preparation unit 202 analyzes the text format of invoice data to determine a service provider, selects a corresponding template based on that service provider, and performs comparison and preparation functions according to that template to adjust the invoice data as necessary to fall within the expected criteria of the template for that service provider. Any of these functions listed above may be optional depending on the particular application, may be done in any order, and invoice preparation unit 202 need not perform all of these preparation functions in any one embodiment.

Extraction unit 204 identifies and/or extracts relevant information from invoice data and may optionally store the relevant information in a datastore for later reference and/or processing. Relevant information may comprise at least one of at least one entity characteristic and at least one payment obligation characteristic. Exemplary entity characteristics which may be identified and/or extracted comprise at least one of entity name, entity address(es), among other characteristics as would be apparent to one of ordinary skill in the art. Exemplary payment obligation characteristics which may be identified and/or extracted comprise at least one of service type, service provider, payment amount (e.g. invoiced amount, total amount due, minimum payment amount, etc.), service period (e.g. billing cycle/period, dates service was provided/received), service usage amount (e.g. for utility services, usage could be a quantity of energy used, quantity of water used, etc.), taxes, credits, and fees, among other characteristics as would be apparent to one of ordinary skill in the art. Extraction unit 204 may perform at least one of document understanding, intelligent document processing, keyword searching, and text parsing to identify and/or locate relevant information. Keyword searching may include terms, symbols and formats indicative of relevant information, such as terms like "amount due", "total due", "due date", "$" symbol, "account number", "tax", "fee", "service address", areas with formatting indicative of an address (e.g. city, state abbreviation, zip code sequence), phone number formats, usage indicators such as "kWh", "CCF", "Btu", "Gals" etc. In one aspect, extraction unit 204 may identify category titles and optionally a corresponding location of associated category fees and/or charges in the invoice data. For example, in merchant processing applications, a merchant processing statement or invoice may comprise categories such as "Pending Interchange Charges" or "Pending Financial Charges and Fees". Extraction unit 204 may identify these category terms/titles and subsequently identify corresponding costs associated with each category. In one aspect, extraction unit 204 determines which keyword search terms to look for based on the category(ies) identified. These search terms or exemplary applications are not intended to be limiting, but merely exemplary, and other search terms, symbols and formats are included within the scope of the invention as would be apparent to one of ordinary skill in the art depending on the particular service type and associated invoices, contracts, quotes, statements, etc. In one aspect, as each piece of relevant information is extracted and/or identified, extraction unit 204 assigns the information to a corresponding field within an extracted information datastore 206 (e.g. spreadsheets, databases) for later processing and analysis. In another aspect, each piece of extracted relevant information may be tagged with a corresponding label so that the relevant information is categorized for later mapping to appropriate fields within the extracted information datastore 206 (e.g. spreadsheets, databases).

In one aspect, extraction unit 204 may identify additional information associated with an entity. Additional information may comprise at least one of entity industry, entity geographic location(s) of operation, entity revenue, and a number of employees employed by the entity, among other characteristics as would be apparent to one of ordinary skill in the art. Extraction unit 204 may identify additional entity characteristics via use of at least one of artificial intelligence, robotic processing automation, and searching digital records (such as databases and/or websites). In one aspect, extraction unit 204 may use a web crawler to identify the industry of a customer and add this info to a corresponding field in the extracted information database. This may comprise determining a company name and using a web crawler to identify what the company does (e.g. identify business functions). Then the extraction unit 204 may classify the company as belonging to a particular industry and store this industry information in the extracted information datastore 206 in association with the customer.

In one aspect, extraction unit 204 may first determine a service provider and/or service type via at least one of the methods above, then use a corresponding template from template unit 203 (if one exists for the service provider) in order to perform targeted searching and/or identification of certain keywords in designated locations as opposed to searching the entirety of the invoice data document. This can improve speed and accuracy of locating relevant information. If no template exists, extraction unit 204 may identify locations where relevant information is found during the relevant information extraction and provide such information to template unit 203 for use in building a template for the associated service provider and/or type for later use in extraction processes.

As an alternative to, or in addition to, obtaining invoices and performing information extraction, audit module 101 may obtain relevant information in a more direct form such as via manual data entry. For example, customers may enter the necessary information into fields through a network portal using their user device such as through an application interface or through a web browser interface. The relevant information is received by the audit module 101 and may be used to populate the extracted information datastore 206. In this scenario, audit module 101 may invoke the functions of evaluation and recommendation unit 205 without requiring action from invoice data interface 201, invoice data preparation unit 202, template unit 203, and extraction unit 204.

Template unit 203 stores and creates templates associated with invoice data such as invoice(s) and service related documents such as contract(s) and quotes. Template unit 203 may be used to manually create a template for a given service provider or service industry by establishing specific coordinates and regions within which each of the relevant pieces of information that should be extracted are found. In one embodiment, template creation is automated wherein template unit 203 uses data received from the extraction unit 204 as a result of an extraction process to build a template for a given service provider. The template unit 203 receives location information from the extraction unit 204 such as image/pixel coordinates associated with each relevant piece of information and employs artificial intelligence or machine learning using one or more datasets associated with a given service provider to create a template. Artificial intelligence or machine learning is performed in a processor of a computing system such as those disclosed herein and may employ a neural network as part of the learning and template creation process. The template unit 203 may periodically verify accuracy of and update templates based on where relevant information was located on the processed invoice data as part of the extraction process.

Evaluation and recommendation unit 205 analyzes the extracted information data generated by extraction unit 204 to identify and compute overages and make recommendations to optimize a customer's service plan. Analysis may comprise cross referencing the extracted information datastore 206 with an optimization datastore 207 to identify inefficiencies and billing errors and compute potential savings if modifications were to be made. For example, in one aspect, the extracted information comprises a company name and a service address. The service address is used to identify the state where the service is provided and company name is used to identify an industry in which the client operates. The identified industry and state are then cross referenced with a database of industry-specific sales tax exemptions available in the determined state such as sales tax exemptions on electricity, natural gas or water/sewer for manufacturers. This is merely an exemplary embodiment, not intended to be limiting, and any number of pieces of extracted information may be used individually or in combination in cross-referencing with the optimization datastore 207.

In some embodiments a hierarchy may be applied to prioritize the different pieces of extracted information used in the audit analysis and recommendation process. For example, in one aspect, evaluation and recommendation unit 205 first identifies service type, then industry type if available/applicable, then customer location as the main initial categories for further audit analysis. Then, based on service type, evaluation and recommendation unit 205 determines available rate structures for different service providers within that service type which provide service coverage for the identified customer location. The evaluation and recommendation unit 205 also uses customer location information in combination with industry type to determine exemptions, programs, benefits, incentives, etc. which are available to the customer for the given service type. In one aspect, the evaluation and recommendation unit 205 compares the customer service level for a given service type with a database of service levels of like-type businesses (e.g. same industry, similar usage details, etc.) in order to optimize the customer's service and make appropriate recommendations. This hierarchy is merely exemplary and various hierarchies may be applied depending on the particular application and extracted information as would be apparent to one of ordinary skill in the art.

In this way, evaluation and recommendation unit 205 can determine whether a customer is receiving appropriate incentives, exemptions, the best rate plan for their usage, being charged appropriate fees, etc. and make appropriate recommendations when there is potential cost savings available to the customer. Recommendations may take the form of a generated recommendation report which can be emailed to a customer, provided in a downloadable form or displayed via a web portal or application interface, or otherwise provided to a customer.

Service optimization datastore 207 comprises a plurality of records associated with various service types and service providers. Service optimization datastore 207 comprises records associated with a plurality of service types, including but not limited to utility services, financial services, contracted services, and commercial services. For each service type, service optimization datastore 207 comprises a plurality of service provider entries and data associated with the associated service. For example, for utility service providers, optimization datastore 207 comprises data associated with each service provider's fees and rate structures, while for other services, optimization datastore 207 comprises data associated with available service levels and associated fees. Additionally, service optimization datastore 207 comprises records associated with state and local municipalities and their associated programs, benefits, credits, incentives, exemptions, etc., some of which may be tied to particular industries. Audit module 101 may use a web crawler to periodically update the optimization datastore. For example, in the context of utility service providers, a web crawler may periodically capture updated rate structures published on service provider websites and update the service optimization datastore 207 with the updated rate structure information. In one aspect, a web crawler is used to periodically update programs, benefits, credits, incentives, exemptions and the like associated with state and local municipalities within the optimization datastore 207.

In one embodiment, audit module 101 applies the above concepts to perform a one time analysis of single invoice data or a batch of invoice data. For example, in one embodiment, audit module 101 may request six or twelve months worth of invoices in order to perform an initial audit and make appropriate recommendations. In other embodiments, audit module 101 performs regularly repeating audit analysis. For example, audit module 101 may be configured to automatically receive new invoices from a service provider (if authorized by a customer), such as on a monthly basis, to perform ongoing audit analysis and provide appropriate recommendations over time. Alternatively, audit module 101 periodically sends reminder notifications to customers indicating that it is time to submit a new invoice or new batch of invoices for updated audit analysis.

Figure 3:
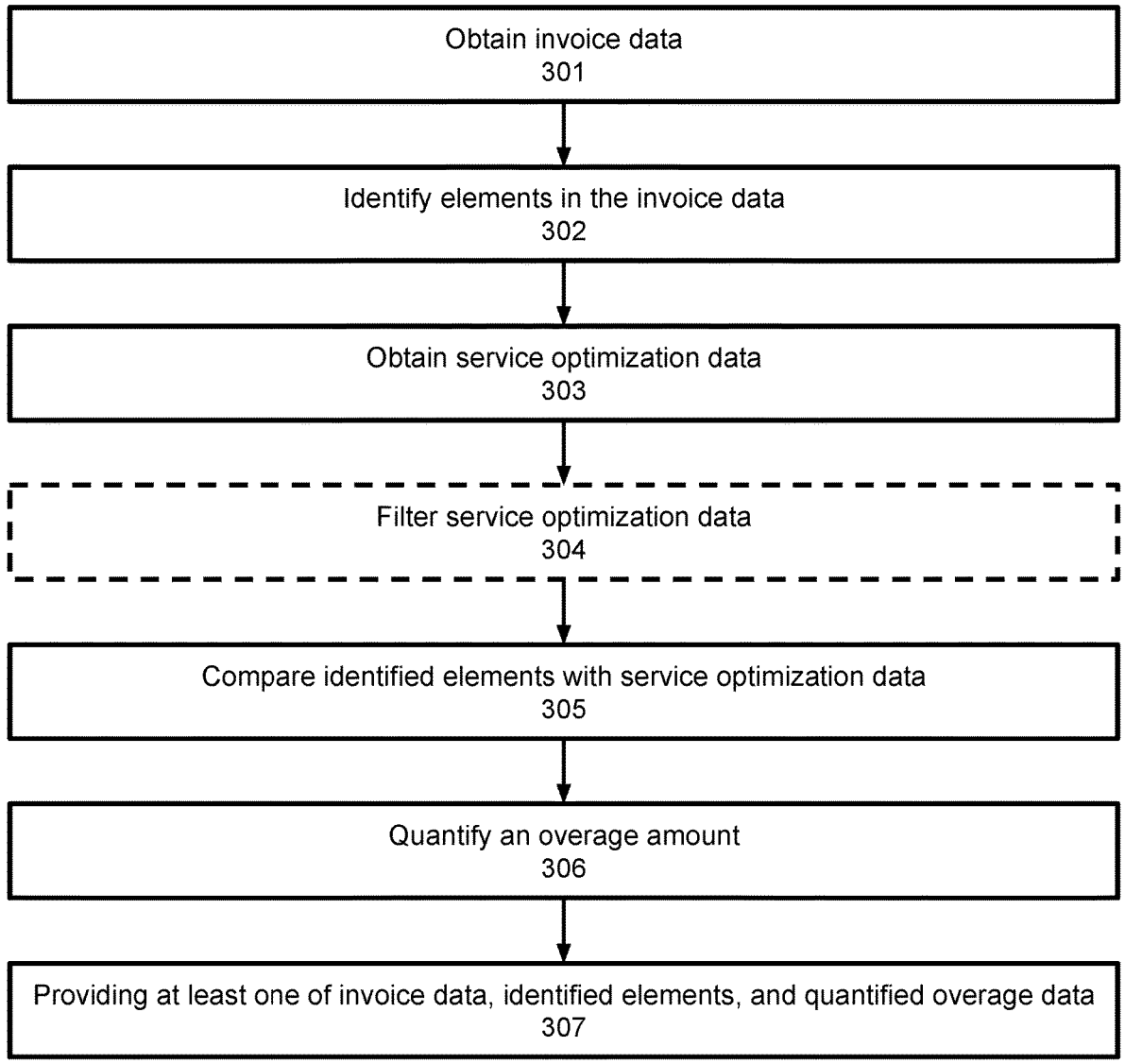
FIG. 3 illustrates an automated auditing and recommendation process according to one embodiment of the invention.

FIG. 3 illustrates an exemplary process for automated auditing and providing recommendations, in accordance with one embodiment of the invention. The process comprises obtaining invoice data 301, identifying elements in the invoice data 302, obtaining service optimization data 303, filtering the service optimization data 304, comparing the identified elements with the filtered service optimization data 305, quantifying an overage amount 306, and providing at least one of the invoice data, identified elements, and quantified overage data 307. Any of the steps listed here may be optional and the steps may be completed in various orders and/or simultaneously depending on the preferred application as would be recognized by one of ordinary skill in the art without departing from the scope of the invention. The process may be a computer implemented process wherein at least one processor is configured to execute at least the exemplary steps listed.

The process begins at step 301 by obtaining invoice data such as at least one of invoice(s), service agreement(s)/contract(s), terms of service, and/or service quote(s). Invoice data generally refers to data associated with services received by, used by or provided to an entity (such as an individual or business). Invoice data may be any source of data for use in auditing, which may also be referred to herein as audit source data, and may not necessarily be derived solely from invoices. For example, invoice data may comprise data associated with service contracts, service quotes, terms of service, and the like, which may serve as a basis for formal invoicing at a later time. Invoice data may be obtained in a digital format. Invoice data may be obtained in various forms as would be apparent to one of ordinary skill in the art. For example, invoice data may comprise at least one of uploaded files, imported files, emailed files, scanned documents, images, and raw invoice data. In one aspect, invoice data may be received in various forms including file formats such as portable document format (PDF), joint photographic experts group (JPG or JPEG), portable network graphics (PNG), tagged image file format (TIFF), and the like. In one aspect, invoice data is received in raw data format, including, but not limited to, at least one of in the form of a database entry, data entered via a user interface, and data in an XML file. Step 301 may be performed by, or in association with, a computing device such as invoice data interface 201 of audit module 101 as described in association with FIG. 2 above.

At step 302, the process comprises identifying at least one element in the invoice data relevant for auditing purposes. In one aspect identifying comprises identifying a plurality of elements in the invoice data. In one aspect, the identifying at least one element comprises computationally recognizing the at least one element. The at least one element may comprise at least one of an entity characteristic(s) and a payment obligation characteristic(s). Entity characteristics may comprise characteristics associated with the entity receiving or using the associated service. The entity may be at least one of a business, a business facility, an individual, a group of individuals, a residence, etc. Exemplary entity characteristics may comprise, but are not limited to, at least one of entity name, entity address(es), entity industry, entity geographic location(s) of operation, entity revenue, and a number of employees employed by the entity. Payment obligation characteristics may comprise at least one of service type, service provider, payment amount (e.g. invoiced amount, total amount due, minimum payment amount, etc.), service period (e.g. billing cycle/period, dates service was provided/received), and service usage amount (e.g. for utility services, usage could be a quantity of energy used, quantity of water used, etc.).

In one aspect, identifying elements in the invoice data comprises identifying at least one of entity name and entity address, then subsequently determining additional entity information using the entity name and/or address. The additional entity information may comprise at least one of entity industry, entity geographic location of operation, entity revenue, and a number of employees employed by the entity. In one aspect, additional entity information may be determined by automatically searching digital records such as databases and websites associated with the entity name and/or address, such as via use of a web crawler to search for and locate relevant information. In one aspect, additional entity information may be determined using at least one of artificial intelligence and robotic process automation.

In one aspect, identifying elements in the invoice data comprises preparing the invoice data for information extraction/identification. Preparing the invoice data may comprise converting invoice data into a text searchable format, if necessary, and modifying invoice data location and size, if necessary. In one aspect, preparing the invoice data may comprise performing at least one of OCR, optical word recognition, intelligent character recognition, intelligent word recognition, text based character recognition, and text based word recognition to convert invoice data into text searchable format, if the received format was not text searchable. In one aspect, identifying elements in the invoice data comprises at least one of document understanding and intelligent document processing. In one aspect, if the location and size of content within the invoice data is not within expected thresholds, the invoice data may be modified to meet expected thresholds such as expected thresholds for use in performing computational recognition of relevant information. For example, content of invoice data as a whole can be moved so that margins fall within an expected threshold for computational analysis. As another example, content of the invoice data can be stretched or shrunk to fit within an expected footprint for computational analysis.

In one aspect, identifying elements in the invoice data comprises extracting relevant information from invoice data by identifying relevant information within invoice data and associating this information with appropriate fields within an extracted information database. In one embodiment, extracting comprises at least one of document understanding, intelligent document processing, keyword searching, and text parsing in order to identify particular terms, symbols, values or other elements of interest. In one embodiment, extracting relevant information uses a template associated with the service provider associated with the invoice data. Relevant information to be extracted comprises, but is not limited to customer name, service provider name, service address, usage data, invoice amount, billing period, taxes, fees, etc. Keyword search includes terms, symbols and formats indicative of relevant information such as terms like "amount due", "total due", "due date", "$" symbol, "account number", "tax", "fee", "service address", areas with formatting indicative of an address (e.g. city, state abbreviation, zip code sequence), phone number formats, usage indicators such as "kWh", "CCF", "Btu", "Gals" etc. In one aspect, identifying elements may comprise identifying category titles and optionally a corresponding location of associated category fees and/or charges with respect to the category title. For example, in merchant processing applications, a merchant processing statement or invoice may comprise categories such as "Pending Interchange Charges" or "Pending Financial Charges and Fees". These category terms/titles may be identified and subsequently used to identify corresponding costs associated with each category. In one aspect, keyword search terms to look for are determined based on the category(ies) identified in the invoice data. This list is not intended to be limiting, but merely exemplary, and other search terms, symbols and formats are included within the scope of the invention as would be apparent to one of ordinary skill in the art depending on the particular service type and associated invoice data format.

In one embodiment, the identifying elements in the invoice data comprises a first step of determining at least one of a service provider and service type associated with invoice data, then determining a template based on the service provider and/or service type, then identifying additional relevant information using the template. In one aspect, the template indicates locations or regions within invoice data where different pieces of relevant information are expected to be found for that service provider. Templates may be developed over time by using artificial intelligence and machine learning approaches using at least one of invoice data received over time from customers and sample invoices or blank invoice forms obtained from various service providers. For example, the spatial distribution of the plurality of elements in the invoice data may be stored in association with the invoice information contained therein. This spatial distribution and corresponding information may be used to create templates based on at least one of service provider and service type for use in future processing of invoice data to aid in the identifying of elements in the invoice data. In one aspect, a database of templates may be created to store templates as they are generated such that they are available for later use. Step 302 may be performed by, or in association with, a computing device such as at least one of invoice data preparation unit 202, template unit 203, and extraction unit 204 of audit module 101 as described in association with FIG. 2 above.

At step 303, the process may comprise obtaining service optimization data which generally comprises data associated with costs and/or usage associated with various services. Service optimization data may comprise at least one of rate schedules, rate plans, incentives, exemptions, and credits associated with various services. In one aspect, obtaining service optimization data may comprise obtaining only service optimization data relevant to at least one of the identified entity and service (e.g. via filtering as discussed in step 304, based on service optimization categorization, or other approaches as would be apparent to one of ordinary skill in the art). For example, in one aspect, obtaining service optimization data may comprise obtaining service optimization data from a datastore by first identifying or limiting the service optimization data to a particular service category/type relevant to the invoice data, then obtaining only this subset of relevant data. Service optimization data may be obtained from a service optimization database or datastore such as datastores 102 and 207 as described in FIGS. 1 and 2 above. In one aspect, the service optimization database or datastore may be populated and/or periodically updated by using at least one of artificial intelligence, robotic process automation, and web crawlers.

At step 304, the process may comprise filtering the service optimization data. In general, a service optimization database or datastore may contain information associated with a plurality of different services, service providers, service locations and the like, some of which may not be pertinent to the particular entity and/or service being evaluated. In these cases, filtering may be performed such that only service optimization data relevant to the entity and/or service is obtained. In one aspect, filtering is optional. In one aspect, filtering may be performed as part of obtaining service optimization data such that only service optimization data relevant to the entity and/or service is obtained in such a way that there is no need to filter the data at this step (e.g. if only relevant service optimization data is obtained then there is no need to filter out the unrelated or non-relevant service optimization data).

At step 305, the process may comprise comparing the elements identified from the invoice data with service optimization data. In one aspect comparing comprises comparing with filtered service optimization data. In one aspect, comparing comprises cross referencing a plurality of elements identified in the invoice data with service optimization data obtained from a service optimization database. In one aspect, comparing comprises applying at least one of artificial intelligence and robotic process automation. In one aspect, comparing comprises determining that there is a less expensive rate structure or plan available to the entity. In one aspect, comparing comprises determining there is at least one of an exemption, a credit, and an incentive available to the entity. In one aspect, comparing comprises determining at least one of a miscalculation and an erroneous tax charge.

In one aspect, comparing comprises determining that there is a difference associated with at least one payment obligation characteristic resulting from comparing at least one payment obligation characteristic of the entity associated with the obtained invoice data and theoretical payment obligation characteristics computed based on the service optimization data. In one aspect, comparing comprises identifying at least one like-type entity for comparison where the like-type entity is identified based on having similar entity characteristics such as those described above such as geographic location, entity industry, number of employees, etc. In one aspect, comparing comprises determining that there is a difference associated with at least one payment obligation characteristic determined from comparing at least one payment obligation characteristic of the entity associated with the obtained invoice data and at least one payment obligation characteristic of a like-type entity. Step 305 may be performed by, or in association with, a computing device such as evaluation and recommendation unit 205 of audit module 101 as described in association with FIG. 2 above.

At step 306, the process may comprise quantifying at least one overage amount. Computing overages generally comprises evaluating identified inefficiencies and billing errors to calculate potential savings for a customer. For example, calculating potential savings may comprise estimating cost savings associated with a different rate structure for which customer is eligible. As another example, potential savings may comprise calculating overpayments and improper fees a customer has been paying historically. In one aspect, quantifying an overage amount comprises computing the amount of any difference(s) detected in step 305. In one aspect, quantifying an overage comprises computing a potential savings by computing the difference between an existing payment obligation characteristic associated with the entity and a theoretical payment obligation characteristic as determined using data associated with the service optimization data. Step 306 may be performed by, or in association with, a computing device such as evaluation and recommendation unit 205 of audit module 101 as described in association with FIG. 2 above.

At step 307, the process may comprise providing relevant information associated with the process. In one aspect, providing comprises providing at least one of invoice data, the at least one identified element(s), and the quantified overage data. In one aspect, providing comprises mapping each piece of relevant information to an appropriate file or file location for access via an API call to obtain and display the relevant information within an appropriate user interface element. In one aspect, providing comprises generating a recommendation report which at least one of summarizes the computed overages. In one aspect the recommendation report comprises suggested actions which the entity could take to remedy the overages. The recommendation report may contain a detailed compilation of potential errors, computed overages, inefficiencies and provide a recommended plan of action for implementation in order to recover overages and/or reduce future costs and avoid the identified errors and inefficiencies. In one aspect, providing the relevant information may comprise transmitting the relevant information to a second computing device, such as via a network. In one aspect, the relevant information may be provided in real-time as the processing occurs and the information becomes available such that users (e.g. service receiving entities and/or auditors) are provided with up to date information regarding the status of the auditing process. In one aspect, providing the relevant information may comprise displaying the relevant information on a second computing device. Step 307 may be performed by, or in association with, a computing device such as evaluation and recommendation unit 205 of audit module 101 as described in association with FIG. 2 above.

In one aspect, the process or portions thereof, may be repeated at random or regularly occurring time intervals in order to periodically check for and identify billing errors or inefficiencies. The process may be configured to automatically trigger the obtaining of new up to date invoice data without requiring action by the entity undergoing audit analysis. In one aspect, the process automatically triggers a repeat of the process and requests up to date invoice data from the entity in order to initiate a new audit analysis process. In this way, an entity simply needs to set up an initial auditing process and then the disclosed systems and methods are operable to routinely audit invoice data and make recommendations to the entity without the entity needing to remember or request a new or updated audit.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Although described herein with an emphasis on utilities, the concepts can be readily adapted for other services including, but not limited to, contracted services (e.g. telecom/wireless, waste removal, information technology hardware/software, etc.), financial services (e.g. merchant processing, bank fees, retirement plans, insurance, etc.), and human resources services (e.g. payroll, employee health insurance and benefits, workers compensation premiums, etc.). As would be apparent to one of ordinary skill in the art, at least one of the entity characteristics, the payment obligation characteristics, and the service optimization data would comprise elements relevant to the particular application of interest.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the devices, systems, units, engines, modules, components or the like mentioned herein, such as audit module 101 and it's subcomponents, may be and/or comprise one or more electronic devices including at least one of hardware, software, and embedded logic components capable of carrying out the appropriate functions disclosed herein.

Figure 4:
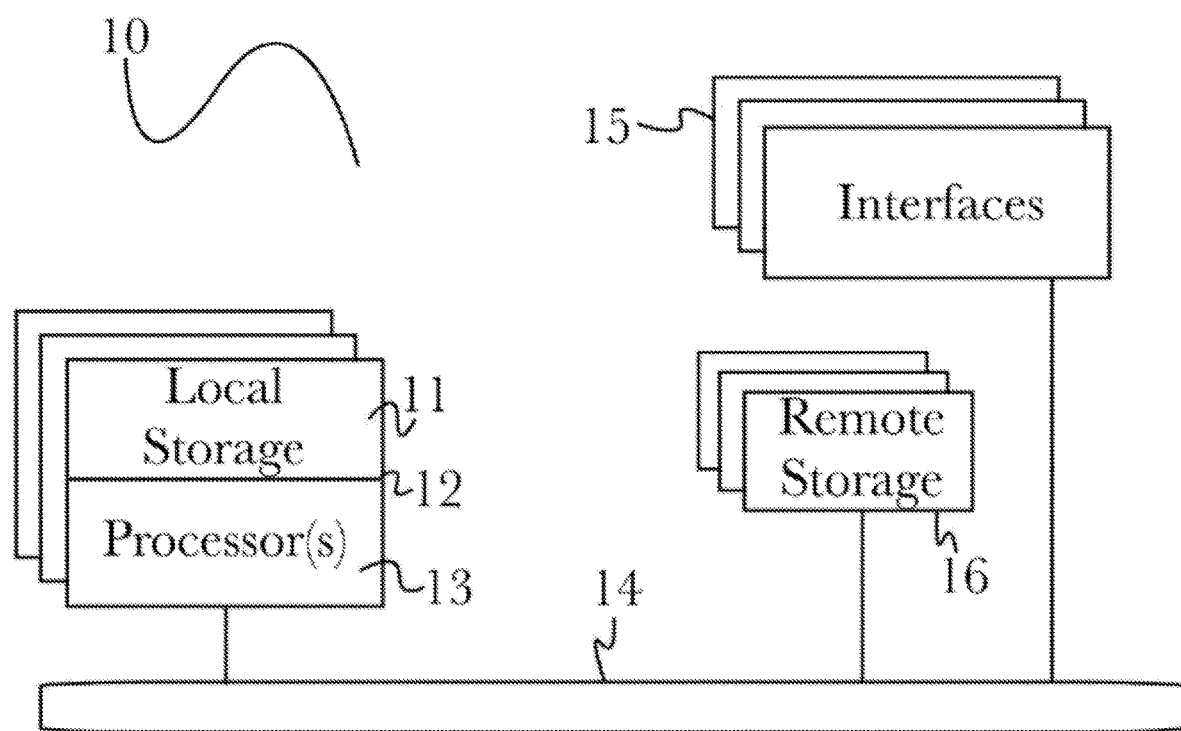
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
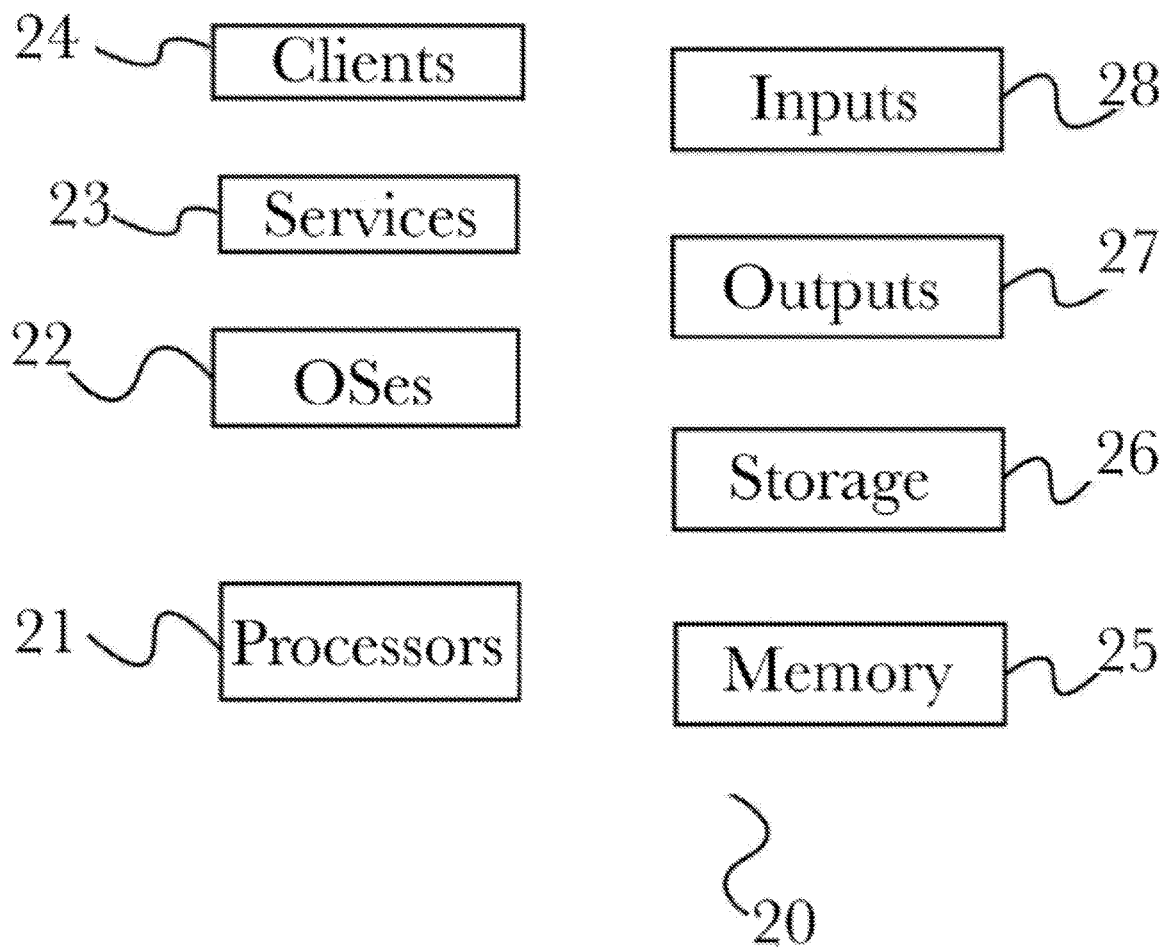
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 6:
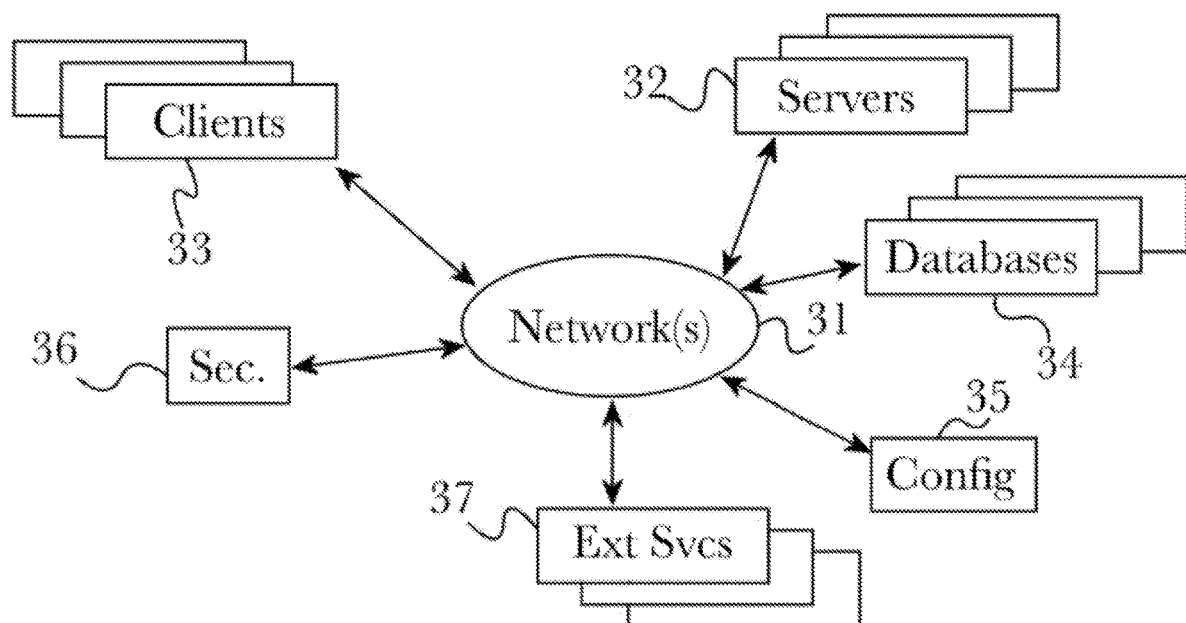
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
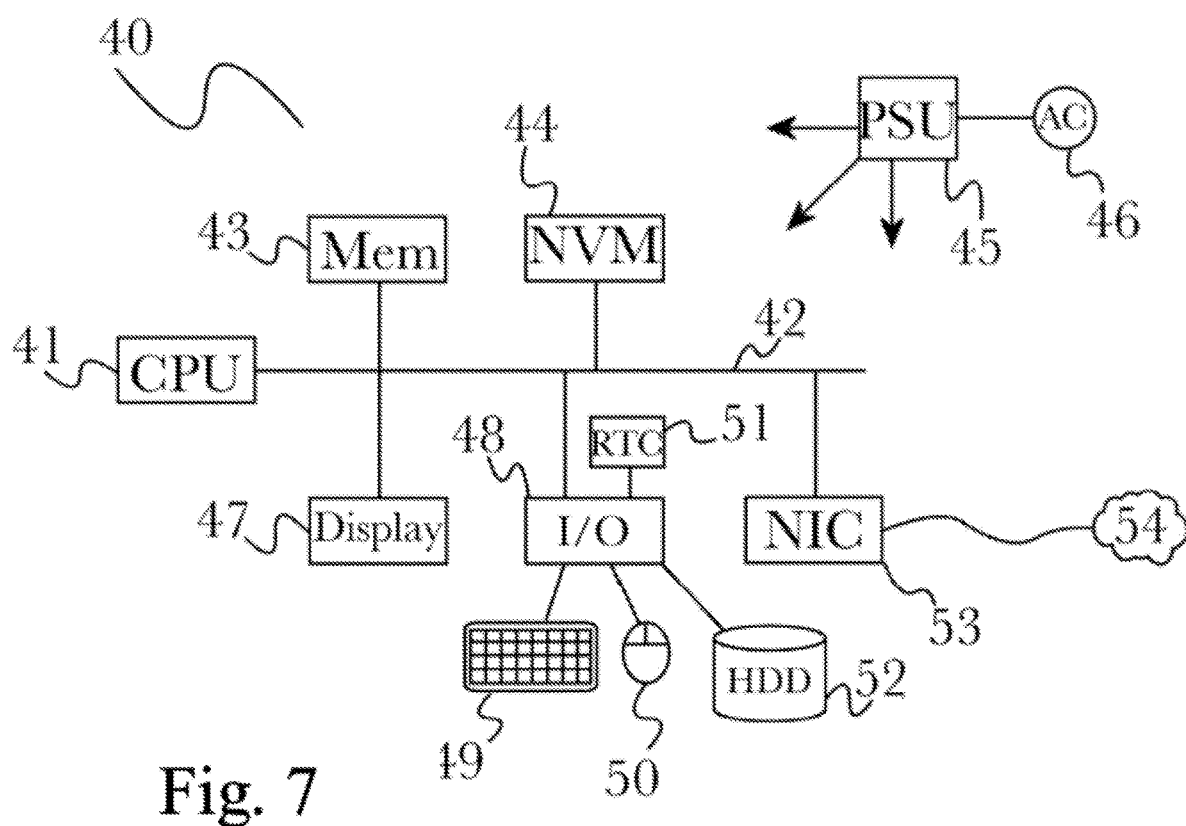
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for identifying potential cost savings and making recommendations to achieve the cost savings, the computer implemented method comprising:
   creating at least one template, wherein the at least one template is created from invoice data, wherein the at least one template is associated with at least one of a service type and a service provider;
   extracting a plurality of digital data from an invoice associated with an entity, the digital data comprising a plurality of elements, the extracting comprising identifying at least one of a service provider and a service type from the digital data, selecting an appropriate template from the at least one created template based on the identified service provider and/or service type, and applying the selected template to identify the plurality of digital data;
   labeling, in a database, the plurality of elements from the digital data by applying a text parsing algorithm to the extracted plurality of digital data, the text parsing algorithm identifying the plurality of elements in the extracted digital data, wherein each label is associated with a category;
   selecting a first category of labeled elements from the plurality of labeled elements within the database, the first category of data including information about an entity;
   applying the first category of labeled element data to at least one of an artificial intelligence algorithm, robotic processing algorithm, and a search algorithm to retrieve additional information associated with the selected first category of labeled elements, the additional information being obtained from at least one of a plurality of external sources, the additional information not being available in the extracted plurality of digital data, the retrieved additional information comprising at least one of entity industry, entity geographic location of operation, entity revenue, and a number of employees employed by the entity;
   using the first category of labeled elements and the additional information to retrieve corresponding service optimization data from a service optimization database, the service optimization data comprising data associated with costs associated with at least one service;
   comparing at least one of the plurality of elements from the invoice data with the service optimization data to identify at least one overage, the at least one overage comprising at least one of a cost reduction opportunity associated with the service and a billing error associated with the service;
   computationally quantifying an overage amount; and
   providing, via an application programming interface (API), at least one of the invoice data, the service optimization data, the identified at least one overage, and the quantified overage amount.

2. The computer implemented method according to claim 1, further comprising preparing the invoice data for computational recognition, the preparing comprising converting the invoice data to a format suitable for computational recognition, the converting comprising applying at least one of optical character recognition, optical word recognition, intelligent character recognition, intelligent word recognition, text based character recognition, and text based word recognition to the invoice data.

3. The computer implemented method according to claim 1, the invoice data associated with at least one of an invoice, a service agreement, a terms of service, and a service quote, and the digital format comprising at least one of a pdf format, an image format, a scanned document format, a database entry, and an XML file.

4. The computer implemented method according to claim 1, the at least one additional entity characteristic determined by automatically searching digital records, the digital records comprising at least one of databases and websites.

5. The computer implemented method according to claim 1, the at least one additional entity characteristic determined using at least one of artificial intelligence and robotic process automation.

6. The computer implemented method according to claim 1, the computational recognizing comprising performing at least one of document understanding, intelligent document processing, keyword searching, and text parsing on the invoice data.

7. The computer implemented method according to claim 1, wherein the template indicates a spatial distribution of the plurality of elements within the invoice data.

8. The computer implemented method according to claim 1, wherein the obtaining service optimization data comprises obtaining service optimization data associated with a plurality of services and filtering the service optimization data based on at least one of the at least one entity characteristic and the at least one payment obligation characteristic in order to limit the service optimization data to service optimization data associated with a service associated with the invoice data.

9. The computer implemented method according to claim 1, the service optimization data comprising at least one of rate schedules, rate plans, incentives, exemptions, credits.

10. A computer implemented method for identifying potential cost savings and making recommendations to achieve the cost savings, the computer implemented method comprising:
creating at least one template, wherein the at least one template is created from invoice data, wherein the at least one template is associated with at least one of a service type and a service provider;
extracting a plurality of digital data from an invoice associated with an entity, the digital data comprising a plurality of elements, the extracting comprising identifying at least one of a service provider and a service type from the digital data, selecting an appropriate template from the at least one created template based on the identified service provider and/or service type, and applying the selected template to identify the plurality of digital data;
labeling, in a database, the plurality of elements from the digital data by applying a text parsing algorithm to the extracted plurality of digital data, the text parsing algorithm identifying the plurality of elements in the extracted digital data, wherein each label is associated with a category;
selecting a first category of labeled elements from the plurality of labeled elements within the database, the first category of data including information about an entity;
applying the first category of labeled element data to at least one of an artificial intelligence algorithm, robotic processing algorithm, and a search algorithm to retrieve additional information associated with the selected first category of labeled elements, the additional information being obtained from at least one of a plurality of external sources, the additional information not being available in the extracted plurality of digital data, the retrieved additional information comprising at least one of entity industry, entity geographic location of operation, entity revenue, and a number of employees employed by the entity;
using the first category of labeled elements and the additional information to retrieve corresponding service optimization data from a service optimization database, the service optimization data comprising data associated with costs associated with at least one service, the service optimization data obtained from a service optimization database, wherein the service optimization database is populated and/or updated by at least one of artificial intelligence, robotic process automation, and web crawlers;
comparing at least one of the plurality of elements from the invoice data with the service optimization data to identify at least one overage, the at least one overage comprising at least one of a cost reduction opportunity associated with the service and a billing error associated with the service;
computationally quantifying an overage amount; and
providing, via an application programming interface (API), at least one of the invoice data, the service optimization data, the identified at least one overage, and the quantified overage amount.

11. The computer implemented method according to claim 1, wherein the comparing comprises applying at least one of artificial intelligence and robotic process automation in order to identify at least one like-type entity for comparison, the like-type entity identified based on at least the identified entity characteristics.

12. The computer implemented method according to claim 1, wherein quantifying the overage amount comprises computing a difference between the service optimization data and the invoice data.

13. The computer implemented method according to claim 1, wherein providing comprises mapping at least one of the invoice data, the filtered service optimization data, the identified at least one overage, and the quantified overage amount to at least one designated storage location, wherein an API call is used to access the at least one designated storage location in order to display the at least one of the invoice data, the filtered service optimization data, the identified at least one overage, and the quantified overage amount via a user interface.

14. The computer implemented method according to claim 1, wherein providing comprises sending at least one of the invoice data, the filtered service optimization data, the identified at least one overage, and the quantified overage amount, to a second computing device.

15. The computer implemented method according to claim 1, wherein providing comprises generating a recommendation report, the recommendation report comprising at least one of a recommendation associated with at least one of obtaining reimbursement for an identified overage and reducing future costs associated with an identified overage.

16. A system for identifying potential cost savings and making recommendations to achieve the cost savings, the system comprising:
control circuitry configured to perform a method comprising:
creating at least one template, wherein the at least one template is created from invoice data, wherein the at least one template is associated with at least one of a service type and a service provider;
extracting a plurality of digital data from an invoice associated with an entity, the digital data comprising a plurality of elements, the extracting comprising identifying at least one of a service provider and a service type from the digital data, selecting an appropriate template from the at least one created template based on the identified service provider and/or service type, and applying the selected template to identify the plurality of digital data;
labeling, in a database, the plurality of elements from the digital data by applying a text parsing algorithm to the extracted plurality of digital data, the text parsing algorithm identifying the plurality of elements in the extracted digital data, wherein each label is associated with a category;
selecting a first category of labeled elements from the plurality of labeled elements within the database, the first category of data including information about an entity;
applying the first category of labeled element data to at least one of an artificial intelligence algorithm, robotic processing algorithm, and a search algorithm to retrieve additional information associated with the selected first category of labeled elements, the additional information being obtained from at least one of a plurality of external sources, the additional information not being available in the extracted plurality of digital data, the retrieved additional information comprising at least one of entity industry, entity geographic location of operation, entity revenue, and a number of employees employed by the entity;

using the first category of labeled elements and the additional information to retrieve corresponding service optimization data from a service optimization database, the service optimization data comprising data associated with costs associated with at least one service;

comparing at least one of the plurality of elements from the invoice data with the service optimization data to identify at least one overage, the at least one overage comprising at least one of a cost reduction opportunity associated with the service and a billing error associated with the service;

computationally quantifying an overage amount; and providing, via an application programming interface (API), at least one of the invoice data, the service optimization data, the identified at least one overage, and the quantified overage amount.

17. A non-transitory computer readable medium comprising instructions that, when executed by a processor, cause the processor to perform a method for identifying potential cost savings and making recommendations to achieve the cost savings the method comprising:

creating at least one template, wherein the at least one template is created from invoice data, wherein the at least one template is associated with at least one of a service type and a service provider;

extracting a plurality of digital data from an invoice associated with an entity, the digital data comprising a plurality of elements, the extracting comprising identifying at least one of a service provider and a service type from the digital data, selecting an appropriate template from the at least one created template based on the identified service provider and/or service type, and applying the selected template to identify the plurality of digital data;

labeling, in a database, the plurality of elements from the digital data by applying a text parsing algorithm to the extracted plurality of digital data, the text parsing algorithm identifying the plurality of elements in the extracted digital data, wherein each label is associated with a category;

selecting a first category of labeled elements from the plurality of labeled elements within the database, the first category of data including information about an entity;

applying the first category of labeled element data to at least one of an artificial intelligence algorithm, robotic processing algorithm, and a search algorithm to retrieve additional information associated with the selected first category of labeled elements, the additional information being obtained from at least one of a plurality of external sources, the additional information not being available in the extracted plurality of digital data, the retrieved additional information comprising at least one of entity industry, entity geographic location of operation, entity revenue, and a number of employees employed by the entity;

using the first category of labeled elements and the additional information to retrieve corresponding service optimization data from a service optimization database, the service optimization data comprising data associated with costs associated with at least one service;

comparing at least one of the plurality of elements from the invoice data with the service optimization data to identify at least one overage, the at least one overage comprising at least one of a cost reduction opportunity associated with the service and a billing error associated with the service;

computationally quantifying an overage amount; and providing, via an application programming interface (API), at least one of the invoice data, the service optimization data, the identified at least one overage, and the quantified overage amount.

* * * * *